Patented July 23, 1929.

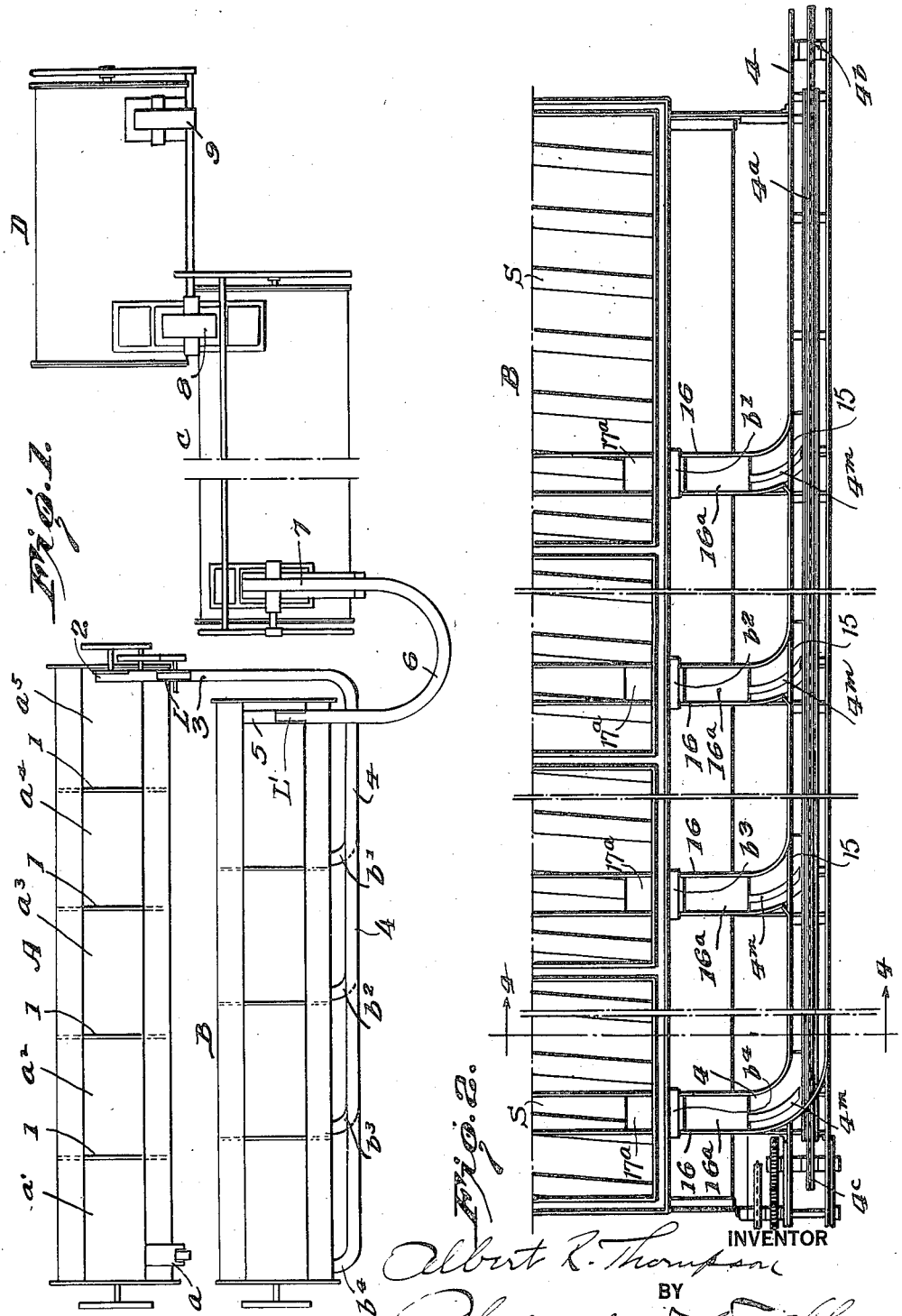

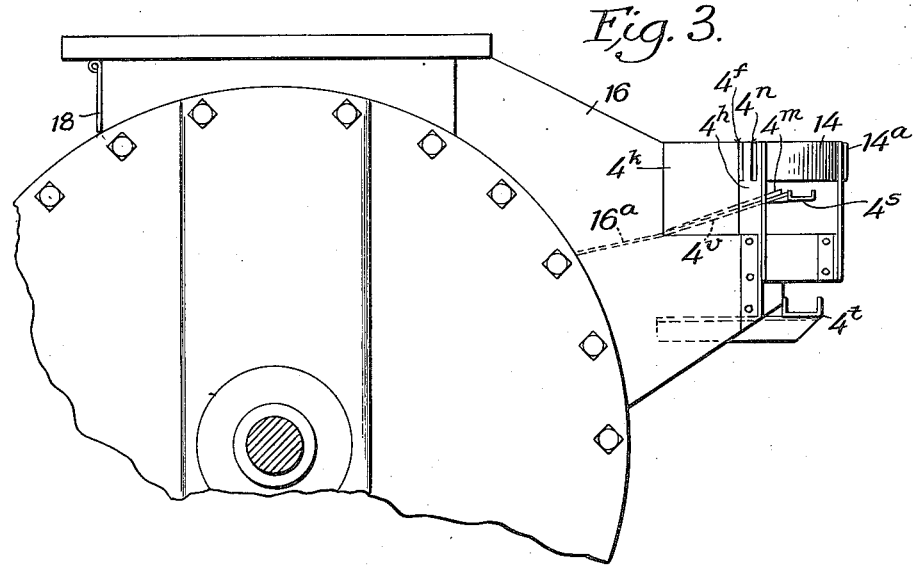
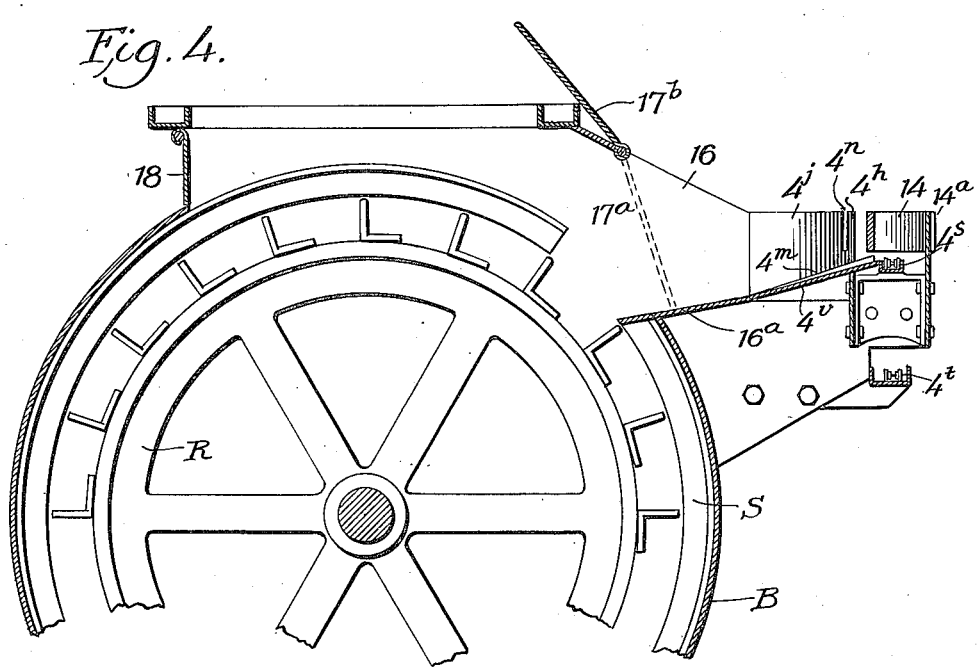

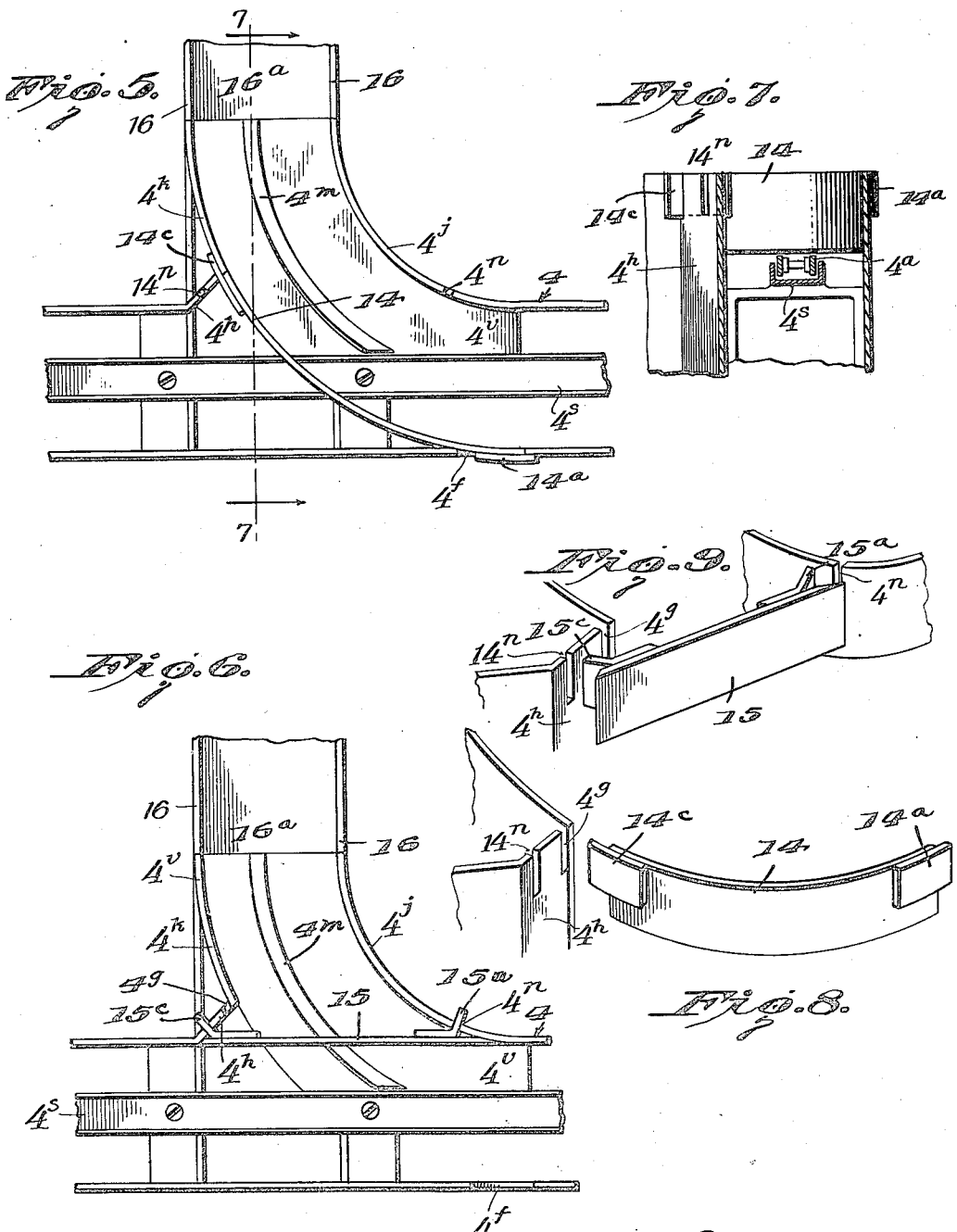

1,721,753

UNITED STATES PATENT OFFICE.

ALBERT R. THOMPSON, OF SAN JOSE, CALIFORNIA, ASSIGNOR TO ANDERSON-BARN-GROVER MFG. CO., OF SAN JOSE, CALIFORNIA, A CORPORATION OF CALIFORNIA.

CANNING APPARATUS.

Application filed April 6, 1927. Serial No. 181,498.

This invention is an improvement in canning machines or apparatus for cooking or otherwise treating goods in containers.

One object of the invention is to provide an apparatus for use in performing the method of processing condensed or evaporated milk in hermetically sealed containers, as disclosed in my Patent No. 1,491,038 of June 24, 1924, and my companion application filed March 21st, Serial No. 176,983.

A further object of the invention is to provide novel means for varying the time of travel of the cans through the tank or chamber in which they are being treated by varying the point of entry of the cans into such tank, this feature of the invention residing in novel adjustable switch devices whereby cans may be deflected from a canway extending beside the tank into any one of the plurality of inlets into the tank.

In the accompanying drawings I have diagrammatically illustrated the apparatus, and also illustrated in detail the novel switching devices, for feeding the cans into the various inlets of the tank and will explain the invention with reference to said drawings, and summarize in the claims the essentials of the invention, and novel features of construction and novel combinations of parts for which protection is desired.

In said drawings:

Figure 1 is a diagrammatic plan view, partly broken, of a novel apparatus for performing the aforesaid method or process;

Fig. 2 is an enlarged plan view of part of a tank or chamber equipped with my novel variable feed devices;

Fig. 3 is an end view of Fig. 2;

Fig. 4 is an enlarged transverse section on line 4—4, Fig. 2;

Fig. 5 is an enlarged detail plan view showing the curved adjustable gate;

Fig. 6 is a similar view showing the straight adjustable gate;

Fig. 7 is a detail section on line 7—7, Fig. 5;

Figs. 8 and 9 are detail views of the gates detached.

In carrying out the process described in my aforesaid application I provide an apparatus such as shown in Fig. 1, which comprises a primary preheater A; a preheat-holder B; a cooker or sterilizer C; and a cooler D; through all of which the cans are successively passed.

The preheater A is shown as having spaced interior partitions 1, which divide it into five compartments $a^1$, $a^2$, $a^3$, $a^4$, $a^5$, through which the cans are successively passed. In treating milk the temperature of the first compartment is approximately 110° F.; the second compartment 140° F.; the third compartment 160° F.; and the fourth 200° F., so that the cans passing successively through these compartments are gradually increased in temperature. The preheat-holder B may or may not be divided into compartments; but a uniform temperature of about 210° F. is maintained therein. A uniform temperature of about 240° F. is maintained in the sterilizer C, and a temperature of about 150° F. or less is maintained in cooler D.

The cans can be fed into chamber $a^1$ of the preheater A through the inlet $a$, and are passed successively through the several successively hotter chambers of the preheater to the outlet 2, where they are discharged into a runway 3, through which they pass by gravity to a canway 4, along which they are moved by an endless conveyor of any suitable construction, preferably a link chain conveyor $4^c$.

The canway 4 extends lengthwise of the preheat-holder B and cans may be switched from the canway 4 into the preheat-holder B at any one of the several inlet points $b^1$, $b^2$, $b^3$, $b^4$, thereof according to the length of the time it is desired to hold the cans under uniform heat in the preheater before discharging them into the sterilizer C.

The cans are discharged from preheat-holder B, at the outlet 5, into a gravity chute 6, through which they are directed into the inlet of the sterilizer C through a feed valve 7, which is preferably steam tight. This valve may be constructed as shown in my Patent No. 1,188,581 of June 27, 1916, but preferably I use rotary valves such as shown in my Patent No. 1,385,594 of September 29, 1920, or reissue Patent No. 15,334; or any other suitable steam type valve may be used.

The cans are discharged from the outlet of the sterilizer C into the cooler D—preferably by means of a suitable valve 8 adapted to receive cans from the outlet of the sterilizer and deliver them into the inlet of the cooler. This valve may be constructed as shown in my Patent No. 1,385,594 aforesaid. The cans may be discharged from the outlet of the cooler through a valve 9 which may be like valve 7.

When the temperature of the sterilizer is above 212°, a pressure above atmospheric should be maintained in the sterilizer and in the cooler to prevent the cans being injured by the internal pressure therein, and the cans should not be exposed to the atmosphere in passing from the sterilizer into the cooler.

Preferably a leaky can detector L is arranged between the outlet of the preheater A and the inlet of preheat holder B, and a leaky can detector $L^1$ is arranged between the outlet of the preheat holder B and the inlet of the sterilizer C, so that leaky cans may be detected and removed before they reach the preheat-holder B or before they reach the sterilizer C. The leaky can detectors used are preferably like those shown in my Patent No. 1,485,895 of March 4, 1924.

Figs. 2 et seq. show more in detail the novel feed mechanisms for the preheat-holder. The cans are traversed along the canway 4 by an endless detachable link chain $4^a$, the upper run of which is guided by a channel iron $4^s$ and its lower run by a channel iron $4^t$. The chain $4^a$ runs over sprockets $4^b$ and $4^c$ at opposite ends of the canway, and one of these sprockets may be driven by gears, as indicated in the drawing, or by other suitable means, operated from the main drive shaft.

The cans are carried forward by the conveyors in the direction of the arrows. The left hand end of the canway 4 opposite inlet $b^4$, is bent inwardly at an angle of 45°, as shown in Figs. 1 and 2, so that the cans brought forward by the chain will be directed into the inlet $b^4$ at the left hand end of the tank, which inlet is furthest removed from the receiving end of the canway 4.

In the inner wall of the canway 4, at points adjacent the several inlet openings $b^1$, $b^2$, $b^3$, $b^4$, are openings which may be closed by removable gates 14 and the wall of the canway curved inwardly, toward the adjacent inlet, as at $4^j$. At the other side of each opening there is a curved plate $4^k$, corresponding in curvature with part $4^j$ but spaced therefrom to permit the passage of a can therebetween. At any one of these openings the cans may be switched from the canway 4 into the adjacent inlet opening by means of a curved gate 14, which preferably consists of a curved metal plate having a lapped piece $14^a$ on its outer end adapted to be engaged with a slot $4^f$ in the outer side wall of the canway 4; and having a lapped piece $14^c$ on its other end adapted to be engaged with a slot $14^g$ in an inwardly inclined portion $4^h$ of the inner side wall of the canway as shown.

Adjacent each of the inlet openings $b^1$, $b^2$, $b^3$, and $b^4$, the side portions $4^j$, $4^k$ are curved inwardly for about 90° and between parts $4^j$, $4^k$ is a curved bottom plate $4^v$. The construction is such that cans brought forward on the conveyor and contacting with the gate 14 (see Figs. 2 and 5) will be deflected inwardly at right angles to the canway 4, and roll by gravity into the adjacent inlet opening of the tank.

To facilitate the turning movement of the cans into an inlet opening a curved bar $4^m$ is arranged in the path of the can between the plates $4^j$, $4^k$, as shown, this bar being so placed as to cause the cans to slightly tilt upwardly at the end adjacent curved plate $4^k$. The adjustable gate 14 can be placed as desired in the canway adjacent any one of the openings $b^1$, $b^2$, $b^3$, through which it is desired to introduce cans into the tank.

At the points where the cans are not to be introduced into the tank, the openings in the inner side of the canways are closed by straight gates 15. These gates fit the openings in the inner sides of the canway. As shown each gate 15 is provided with an inwardly projecting piece $15^a$ on one end adapted to engage a slot $4^n$ in the inner wall of the canway adjacent the inlet opening as indicated in the drawings and on the other end of gate 15 is a projecting piece $15^c$ adapted to engage a slot $14^n$ in the part $4^h$.

The curved plates $4^j$ and $4^k$ and $4^v$ direct the deflected cans to and between parallel plates 16, which extend partly over the spiral canway in the tank; and between the plate 16 is arranged a bottom plate $16^a$ by which the cans are directed onto the reel R through openings $17^a$ in the spiral canway S. Each opening $17^a$ when not in use may be closed by a hinged door $17^b$, when no cans are being fed to such opening.

The plates 16 preferably extend across the top of the spiral canway to the opposite side of the tank, as shown in Figs. 3 and 4, and at that side is a door 18 which is freely hinged at the top, and in case a can for any reason fails to seat between the angle irons of the reel, and is carried upon the top of two cans which are properly seated, it will pass by gravity through this swinging door 18 and will not obstruct the continuity of the can flow.

The operator will adjust the gates 14 and 15 according as to whether or not he desires to have the cans deflected into any one of the openings $b^1$, $b^2$, $b^3$, or passed on to the opening $b^4$. As the cans are carried forward by the chain $4^a$ they will encounter gate 14, if in place, and be diverted thereby into the adjacent opening ($b^1$, $b^2$ or $b^3$) or if the gate 14 is removed the cans will pass on to the end of the chute and enter inlet opening $b^4$.

I do not herein claim the desired apparatus for use in performing the method of processing evaporated milk, etc. in hermetically sealed containers, as this forms the subject matter of companion divisional application (Case No. 7462) filed in compliance with the official requirement for division of this application.

I claim:

1. In a combination with a chamber having a plurality of inlets, a canway beside said chamber extending adjacent said inlets and having openings in its side adjacent the inlets; an adjustable curved gate attachable to the canway at the opening adjacent the inlet into which it is desired to direct the cans; and an adjustable straight gate attachable to the canway to close the openings in the canway adjacent the inlets by which the cans are to be passed.

2. In apparatus of the character specified in claim 1 the curved gate having portions adapted to engage slots in the sides of the canway adjacent the inlet opening to detachably secure the gate in place.

3. In an apparatus as set forth in claim 1, the straight gate being provided with portions adapted to engage slots in the sides of the canway adjacent the ends of the opening therein.

4. In combination with a tank having a spiral canway therein and a plurality of inlets into said spiral canway, a canway exterior to said tank and extending past the inlets and having openings in its side adjacent the inlets, and straight and curved gates selectively insertible in any of said openings; the curved gates being adapted to direct cans through the openings, and the straight gates adapted to prevent cans passing through the openings.

In testimony that I claim the foregoing as my own, I affix my signature.

ALBERT R. THOMPSON.